United States Patent [19]
Atkins et al.

[11] Patent Number: 5,487,107
[45] Date of Patent: * Jan. 23, 1996

[54] METHOD AND APPARATUS FOR PROCESSING TELEPHONE CALLS CHARGED TO CREDIT CARDS

[75] Inventors: Jean Atkins, Naperville, Ill.; Richard M. Harris, Hoboken; Julie M. Ladieu-Walton, Freehold, both of N.J.; David C. McChristian, Naperville, Ill.

[73] Assignee: AT&T IPM Corp., Coral Gables, Fla.

[*] Notice: The portion of the term of this patent subsequent to Feb. 15, 2011, has been disclaimed.

[21] Appl. No.: 195,414

[22] Filed: Feb. 14, 1994

Related U.S. Application Data

[63] Continuation of Ser. No. 918,726, Jul. 22, 1992, Pat. No. 5,287,403.

[51] Int. Cl.$^6$ .......................... H04M 1/64; H04M 11/00; H04M 15/00; H04M 17/00
[52] U.S. Cl. .......................... 379/144; 379/91; 379/112; 379/122; 379/123; 379/127; 379/144; 379/84; 379/88
[58] Field of Search .......................... 379/67, 88, 84, 379/91, 112, 122, 123, 127, 144

[56] References Cited

U.S. PATENT DOCUMENTS

| | | | |
|---|---|---|---|
| 3,702,392 | 11/1972 | St. Jean | 235/61.7 |
| 4,439,636 | 3/1984 | Newkirk | 379/123 |
| 4,636,622 | 1/1987 | Clark | 235/380 |
| 4,720,848 | 1/1988 | Akiyama | 379/88 |
| 4,731,818 | 3/1988 | Clark | 379/91 |
| 4,797,910 | 1/1989 | Daudelin | 379/67 |
| 4,947,027 | 8/1990 | Golightly | 235/380 |
| 4,972,461 | 11/1990 | Brown et al. | 379/112 |
| 5,163,083 | 11/1992 | Dowden et al. | 379/88 |
| 5,163,086 | 11/1992 | Ahearn et al. | 379/144 |
| 5,223,699 | 6/1993 | Flynn | 379/91 |
| 5,226,073 | 7/1993 | Albal et al. | 379/144 |
| 5,311,594 | 5/1994 | Penzias | 380/23 |

*Primary Examiner*—Stephen Chin
*Assistant Examiner*—Vijay Shankar
*Attorney, Agent, or Firm*—Eugene J. Rosenthal

[57] ABSTRACT

When a telephone caller charges a call to a commercial credit card an announcement which includes the name of the credit card issuer is supplied to the caller after the validation of the credit card. In a preferred embodiment, the issuer of the commercial credit card is identified, for purposes of announcing its name, by examining the prefix code of a credit card number supplied by the calling party. Also, in the preferred embodiment, not only the issuer of the commercial credit card but also the name of the telephone carder is supplied as part of the announcement given prior to connecting the calling station to the called station after validation of the credit card. An illustrative such announcement is "Thank you for using AT&T and for charging this call to your American Express card".

15 Claims, 3 Drawing Sheets

FIG. 2

| CARD NUMBER LENGTH | ISSUER ID | VALIDATION PROTOCOL | ISSUER ANN INDEX | ISSUER NAME | COBRANDING |
|---|---|---|---|---|---|
| 13 | 4128 | IXC CCS | 102 | CITIBANK VISA | YES |
| 14 | 9082-9089 | LEC CCS | 103 | NEW JERSEY BELL | YES |
| 14 | 2012-2019 | LEC CCS | 103 | NEW JERSEY BELL | YES |
| 14 | 2122-2129 | LEC CCS | 104 | NYNEX | NO |
| 14 | 5080-5081 | IXC CCS | 106 | AT&T TELEPHONE | YES |
| 15 | 340000-349999 | IXC CCS | 101 | AMERICAN EXPRESS | YES |
| 15 | 370000-379999 | IXC CCS | 101 | AMERICAN EXPRESS | YES |
| 16 | 4784 | IXC CCS | 105 | AT&T UNIVERSAL VISA | YES |

METHOD AND APPARATUS FOR PROCESSING TELEPHONE CALLS CHARGED TO CREDIT CARDS

This is a continuation of application Ser. No. 07/918726, filed Jul. 22, 1992, now U.S. Pat. No. 5,287,403.

TECHNICAL FIELD

This invention relates to the charging of telephone calls to credit cards.

BACKGROUND OF THE INVENTION

As is well known, there are a number of ways in which the charges associated with individual telephone calls can be paid for. These include automatic billing to the calling telephone; the depositing of coins, in the case of a call made from a coin-operated telephone; billing to the called number, a so-called "collect call"; or billing to a so-called "telephone calling card" issued by the telephone companies. The latter are dedicated credit cards that allow a call from any telephone to be charged to the account of the telephone calling card holder.

Because of the continuing trend in America toward a cashless society and a desire of consumers to have all their charges presented on a single statement, the combined commercial credit and telephone calling card was developed by AT&T. Such a card serves a dual role and, as such, has two distinct numbers. The first number is a commercial credit card type number for use in making all purchases except telephone calls. This number originates from a commercial credit card issuer, e.g., VISA. The second number is a telephone calling card type number for use only when charging telephone calls to the combined card. This number originates from the issuing telephone company. A single statement is provided for billing both purchases and telephone calls.

One may also currently charge telephone calls directly to the number of a commercial credit card, but only if the call is placed from specialized telephones that are available in certain public locations. However, further developments will soon provide the desired ultimate flexibility of permitting the charging of telephone calls directly to ordinary commercial credit cards from any telephone set. This functionality is described, for example, in the commonly assigned, co-pending U.S. patent applications, Ser. Nos. 07/636,535 and 07/636,051, both entitled "Telephone Network Credit Card Calling Apparatus and Method of Operation", now U.S. Pat. Nos. 5,226,073 and 5,163,086, respectively.

SUMMARY OF THE INVENTION

Until now, callers charging telephone calls to a credit card a) are informed of the telephone carrier responsible for completing the call, by means of a so-called "audible logo", and b) are thanked for selecting that carrier. In accordance with the principles of the invention, we have realized that, in a calling environment that allows the charging of telephone calls directly to commercial credit cards, it is desirable to supply to the caller an announcement which includes the name of the credit card issuer, such as "Thank your for using your American Express card". Additionally, in accordance with an aspect of the invention, if a call charged to a commercial credit card cannot be completed without operator (attendant) assistance, information identifying the credit card issuer is automatically supplied to the operator so that she may make the announcement.

In a preferred embodiment, the issuer of the commercial credit card is identified, for purposes of announcing its name, by examining the prefix code of a credit card number supplied by the calling party. Also, in the preferred embodiment, not only the issuer of the commercial credit card but also the name of the telephone career is supplied as part of the announcement given prior to connecting the calling station to the called station after validation of the credit card. An illustrative such announcement is "Thank you for using AT&T and for charging this call to your American Express card".

BRIEF DESCRIPTION OF THE DRAWING

In the drawing:

FIG. 2 shows an exemplary structure for the card recognition data base used in the apparatus of FIG. 1.

DETAILED DESCRIPTION

As used herein, the term "card" refers to any type of credit card or credit account mechanism including, but not limited to: a) a telephone-company-issued calling card, b) a combined commercial credit card and telephone calling card, c) a commercial credit card or d) a debit card. A "card number" is a multi-digit string that identifies the account associated with a card. A "card call" is a telephone call whose cost is charged to a card. It will be appreciated that card issuers, i.e., the providers of the credit for each card, need not provide a tangible manifestation, such as embossed plastic, for each card.

Figure 1:
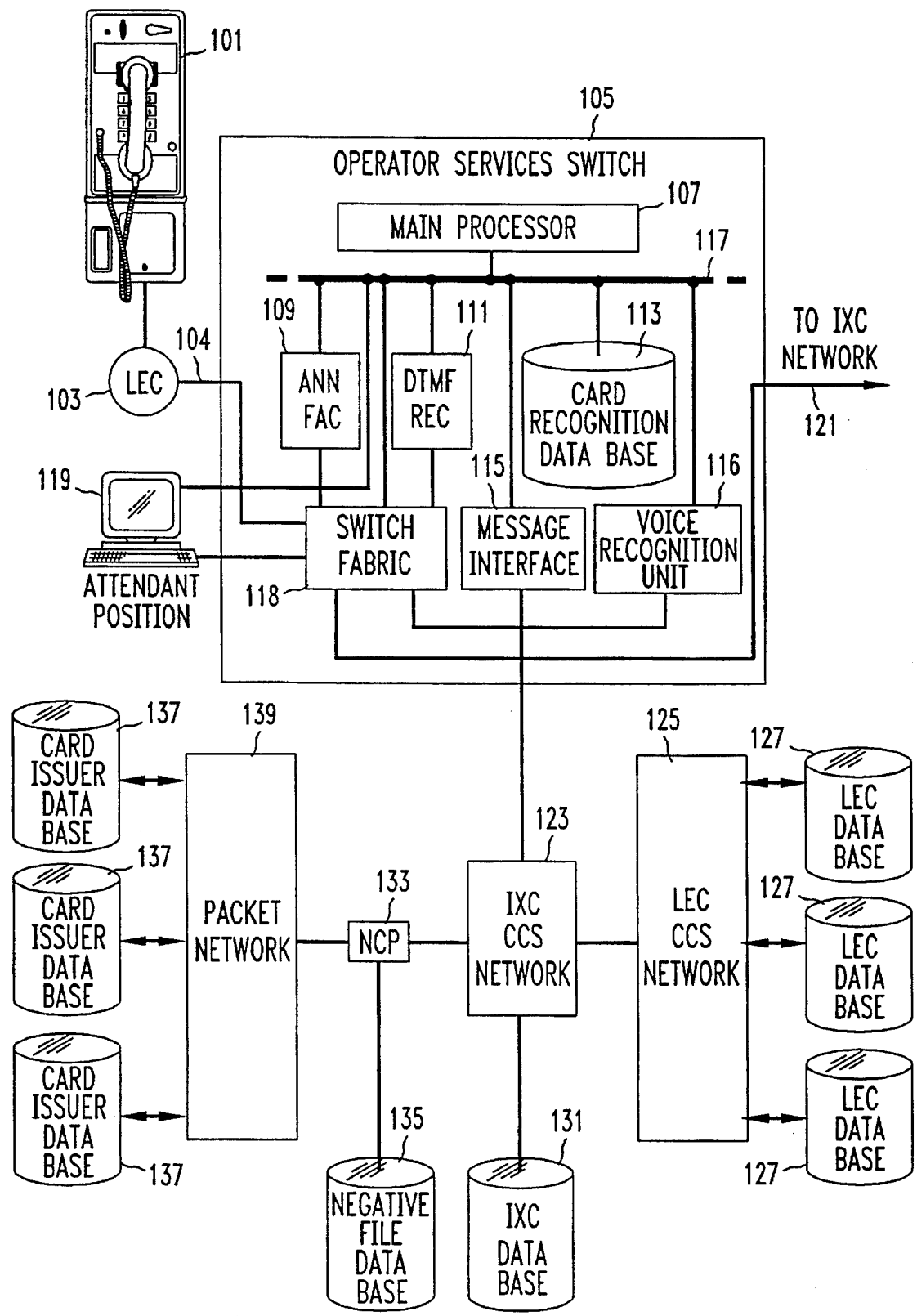
FIG. 1 shows apparatus for use in processing card calls, in accordance with the principles of the invention.

FIG. 1 shows apparatus for use in processing card calls in such a way that an announcement which includes the name of the issuer of the card is made to the calling party, in accordance with the principles of the invention. A calling party originates a card call at telephone station 101 by a) dialing 0+area code+number or b) access code+0+area code+number. A switch of local exchange carrier (LEC) 103 receives the dialed digits and, from the dialed 0, recognizes that the call is an operator services type of call that may be a card call. Therefore, local exchange career (LEC) 103 routes the call to operator services switch 105 for further handling. Operator services switch 105 is a switch that, given the description herein below, can be designed by applying those principles well known to those skilled in the art, to provide special operator type calling services to calling parties, including functionality for realizing the principles of the invention.

If an access code for a specific interexchange carrier (IXC) is not specified as part of the digits dialed by the calling party but yet the call must be carried by an interexchange carrier, local exchange carrier 103 routes the call over a trunk, e.g., trunk 104, to operator services switch 105 of an interexchange carrier. Local exchange carrier 103 is aware of a default interexchange carrier to which telephone station 101 has been assigned. If the dialed digits include an access code specifying a particular interexchange carrier, local exchange carrier 103 routes the call over a trunk to an operator services switch 105 of the specified interexchange carrier. If the call is one which is not to be carried by an interexchange carrier, local exchange carrier 103 routes the call to one of its own operator services switches.

Operator services switch 105 includes: a) main processor 107, b) announcement facility (ANN FAC) 109, c) dual tone multi-frequency receiver (DTMF REC) 111, d) card recognition data base 113, e) message interface 115, f) bus 117, g) switch fabric 118 and h) voice recognition unit 116. Main processor 107 controls the overall operation of operator services switch 105 by performing any necessary processing and exchanging messages with the other components of operator services switch 105 over bus 117. Announcement facility (ANN FAC) 109 can make various announcements which can be heard by the calling party. The announcements, or combinative portions thereof, are prestored in announcement facility (ANN FAC) 109. They are accessed by supplying announcement facility (ANN FAC) 109 with pointers to the announcements. Dual tone multi-frequency receiver (DTMF REC) 111 receives dual tone multi-frequency signals that are transmitted in response to the pressing of keys on the keypad of telephone station 101 and supplies the digit corresponding to each pressed key to main processor 107. Card recognition data base 113 contains at least the information necessary to determine from the digits supplied by a calling party the issuer of the card to which the call is to be charged. Message interface 115 is a protocol conversion unit that permits operator services switch 105 to communicate with a common channel signaling (CCS) network, such as IXC CCS network 123. It is responsible for formatting all messages transmitted to IXC CCS network 123 and for extracting responses received from IXC CCS network 123. In particular, as described in more detail below, card validation query messages are transmitted to IXC CCS network 123 and card valid or invalid response messages are received therefrom.

At various times during a call, switch fabric 118 connects the trunk on which the calling party's call arrived at operator services switch 105, e.g., trunk 104, to announcement facility (ANN FAC) 109 or dual tone multi-frequency receiver (DTMF REC) 111. The purposes of such connections are described further below. Once the billing for a call has been attended to, and the call can be routed to its ultimate destination, switch fabric 118 connects the trunk on which the calling party's call arrived to the rest of the interexchange carrier's network, via link 121.

Attendant position 119, staffed by a human attendant, also interfaces with operator services switch 105 via both bus 117 and switch fabric 118. The interface via bus 117 permits the attendant to exchange information with main processor 107. The interface via switch fabric 118 allows the attendant to convene with the calling party.

IXC CCS network 123 can route queries for card number validation a) to LEC CCS network 125 and ultimately to one of LEC data bases 127, b) to IXC data base 131 or e) to network control point (NCP) 133 and ultimately to either negative file data base 135 or one of card issuer data bases 137, via packet network 139. NCP 133 is a unit of known type that interfaces with packet network 139 and negative file data base 135 so as to present the information contained therein to IXC CCS network 123 as if it originated from a single data base.

Negative file data base 135 contains a list of so-called "hot cards". Hot cards are cards that are known to be invalid, e.g., cards that were reported stolen. Using such a data base speeds the processing of each call attempted using a hot card in that it avoids a full search of the data base of the card issuer. The list of hot cards is supplied periodically by the commercial card issuers. All the other data bases contain listings of valid card numbers against which the card number supplied by the calling party is compared. If the card number is not found in the hot card list of negative file data base 135, a card validity query is sent via packet network 139 to the card issuer data base 137 maintained by the particular card issuer.

Calling cards presently issued by telephone companies generally have telephone-line-number-based numbers, which comprise 1) a subscriber's telephone number plus 2) a four digit personal identification number, or PIN. These cards can be distinguished from commercial credit cards on the basis of the length of their card numbers. Other cards having numbers of the same length as telephone-company-issued-line-number-based cards are distinguished therefrom by properties which make the numbers of the other cards invalid as telephone numbers, such as having a zero as the fourth digit. Should some of the card numbers of two or more card issuers overlap, with no distinguishable features between them, it may be necessary to prompt the calling party for an indication of the issuer of the card that the calling party is using. Such prompting, as well as the receiving of the indication, would be performed by announcement facility (ANN FAC) 109 and dual tone multi-frequency receiver (DTMF REC) 111 working under the control of main processor 107.

FIG. 2 shows an exemplary structure for the information stored in card recognition data base 113. An entry for each issuer is made up of several fields, including a) card number length field 200, b) issuer identification (ID) field 202, c) validation protocol field 204, d) issuer announcement (ANN) index field 206, e) issuer name field 208 and f) cobranding field 210. Card number length field 200 contains the length, i.e., the number of digits, of the card numbers issued by a particular card issuer. The issuer identification (ID) field 202 contains a code or range of codes, up to 7 digit in length, that uniquely identifies the card issuer. Although any number of digits may be used, 7 digits was selected because a) it includes 6 digits, which is the maximum number of digits required under the ISO standard for identifying card issuers and b) it can also accommodate particular telephone-company-issued calling cards such as those that begin with "89". The card number typically includes both a prefix identifying the card issuer and an account number indicating the individual account, so that the issuer identification (ID) field is the first group of numbers embossed on the card as its number. Advantageously, then, in the preferred embodiment, main processor 107 need only examine a) a card's prefix and b) its length to determine the card issuer.

Each card issuer may specify its own format to which a query for validation of card number must conform in order to be processed. Validation protocol field 204 contains indications that specify the proper format for each card issuer. These indications are used by main processor 107 (FIG. 1) to build query messages requesting validation of card numbers. The query messages are transmitted via message interface 115 to IXC CCS network 123 and ultimately to the proper data base.

Issuer announcement (ANN) index field 206 contains pointers to announcements that have been prestored in announcement facility (ANN FAC) 109 so that main processor 107 can cause the appropriate announcements to be made. Such announcements include, in accordance with the principles of the invention, announcements containing the name of the card issuer. Issuer name field 208 contains the name of the card issuer in a form that can be supplied to attendant position 119 and read by an attendant stationed there. For example, the name might be stored as a string of ASCII characters. In accordance with an aspect of the invention, the attendant can read the displayed name as part of an announcement spoken to the calling party.

Figure 3:
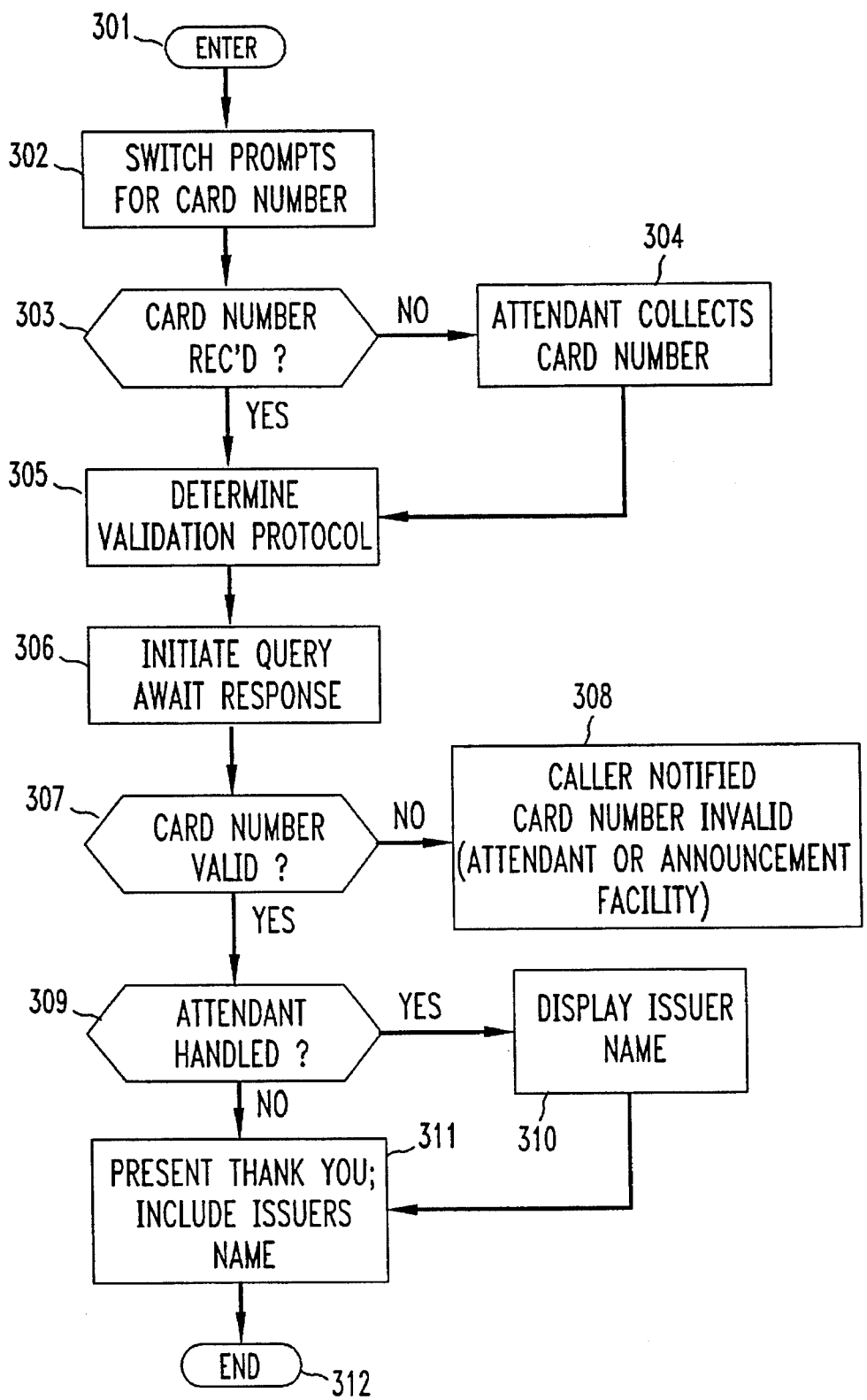
FIG. 3 shows a flow chart of a process for validating a card number and making an announcement which includes the name of the card issuer, in accordance with the principles of the invention.

FIG. 3 shows a flow chart of a process for validating a card number and making an announcement which includes the name of the card issuer, in accordance with the principles of the invention. The process is entered, in step 301, when a caller at telephone station 101 (FIG. 1) initiates a 0+ type of telephone call. The call information, including the dialed digits, is routed by LEC 103 to operator services switch 105. In step 302 (FIG. 3) operator services switch 105 prompts the calling party to supply his card number. To do so, switch fabric 118 connects announcement facility (ANN FAC) 109 to trunk 104 on which the calling party's call was received.

The calling party may supply the card number by pressing keys on the keypad of telephone station 101, thereby generating dual tone multi-frequency signals representing the card number. If signals are so generated, dual tone multi-frequency receiver (DTMF REC) 111 receives and translates them. To this end, switch fabric 118 connects the trunk at which the calling party's call is terminated to dual tone multi-frequency receiver (DTMF REC) 111. The resulting translated digits are supplied to main processor 107, via bus 117.

Conditional branch point 303 tests to determine if main processor 107 received the digits of a card number within a predetermined length of time. If the test result in step 303 is NO, control is passed to step 304, in which an attendant, at attendant position 119, converses with the calling party and has him verbally supply the card number if the call is a card call. The attendant then enters the card number supplied by the calling party into attendant position 119 which, thereafter, transmits it to operator services switch 105. Control then passes to step 305. If the test result in step 303 is YES, indicating that main processor 107 received the digits of a card number within a predetermined length of time, control passes to step 305 directly.

Operator services switch 105 determines the appropriate validation protocol based on the card number that was received, in step 305. The appropriate validation protocol is determined by matching a prefix portion of the digits of the received card number with those listed in issuer ID field 202 (FIG. 2) of card recognition data base 113 for card numbers that have the same length as the received card number. The corresponding validation protocol is, thereafter, retrieved from validation protocol field 204.

In step 306, a validation query is initiated by operator services switch 105 and a response is awaited. The query is transmitted via message interface 115 to IXC CCS network 123, which routes the query appropriately. Conditional branch point 307 tests to determine, upon receipt of a response to the validation query, if the response received indicates that the card number supplied was valid. If the test result in step 307 is YES, control passes to conditional branch point 309, which tests to determine if the call was handled by an attendant at attendant position 119. If the test result in step 309 is NO, indicating that the call was automatically handled, control passes to step 311.

In accordance with the principles of the invention, in step 311, an announcement is presented to the caller thanking them for charging the call to their card. An exemplary announcement is "Thank you for using AT&T and for charging this call to your American Express card". Announcement facility (ANN FAC) 119 generates the announcement for presentation to the calling party. The particular announcement generated is specified in the issuer announcement (ANN) index field 206 (FIG. 2) for the issuer of the card the number of which was supplied by the calling party. Switch fabric 118 couples announcement facility (ANN FAC) 119 to trunk 104 at which the calling party's call is terminated so that the calling party can hear the announcement. Thereafter, the routine is exited via step 312.

If the test result in step 309 is YES, i.e., the call was handled by an attendant, then operator services switch 105 causes the name of the card issuer to be displayed at attendant position 119. The name of the card issuer is retrieved from the issuer name field 208 for the issuer of the card the number of which was supplied by the calling party. Thereafter, control passes to step 311 in which the attendant makes an announcement to the calling party including the name of the card issuer as displayed on attendant position 119, in accordance with an aspect of the invention. Thereafter, the routine is exited via step 312.

If the test result in step 307 is NO, control passes to step 308, in which the caller is notified, by way of an announcement from announcement facility (ANN FAC) 109, that the card number supplied is invalid. In accordance with an aspect of the invention, this announcement can include the name of the card issuer. Alternatively, if the call is handled by an attendant, the attendant will inform the calling party that the card number supplied is invalid. Again, in accordance with an aspect of the invention, the attendant's announcement can include the name of the card issuer. Additionally, regardless of how the announcement is presented, the caller could be transferred, automatically or in response to prompting, to a customer service representative of the card issuer, if his card is denied. Such a transfer would be accomplished by switch fabric I 18 working under the control of main processor 107. Alternatively, a telephone number for customer service of the card issuer could be supplied to the caller as part of the invalidity announcement.

In other embodiments, announcement facility (ANN FAC) 109 can supply announcements that can eventually be perceived by the calling party but are in forms other than voice. For example, announcement facility (ANN FAC) 109 might supply messages, including the card issuer's name, that can be displayed on a display incorporated into telephone station 101. In another embodiment, dual tone multi-frequency receiver (DTMF REC) 111 might be replaced with a message receiver that can receive signals other than dual tone multi-frequency signals. These signals would be supplied from telephone station 101 to deliver the card number to operator services switch 10S. For example, a magnetic card stripe reader could be incorporated into telephone station 101 and supply ISDN-formatted messages containing the card number to operator services switch 105. Alternatively, voice S recognition unit 116, which recognizes the digits of the card as spoken by the caller, might be invoked for use in a particular call instead of dual tone multi-frequency receiver (DTMF REC) 111. Those skilled in the art will also recognize that, for such embodiments, strings other than strings of digits may be used to identify an account associated with a card.

Advantageously, an announcement of the type described for the preferred embodiment, which includes the name of the card issuer and the telephone carrier, is a form of cobranding. Cobranag is a commonly used advertising technique. We have recognized that, in the arena of telephone calls charged to cards, the principles of the invention can be employed to realize the benefits that accrue to those who use cobrasiding. Thus, use of the invention can provide valuable additional advertising reinforcement to the users of particular telephone careers and cards. Furthermore, in other embodiments of the invention, the cobranding could be supplied on a selective basis. Thus, announcements which include the name of the card issuer could be supplied only for those calls that are charged to the cards of predetermined card issuers, for example, those card issuers having a YES indication in cobranding field 210 of card recognition data base 113.

Those skilled in the art will recognize that the principles of the invention may be applied to video telephone calls as well. In such embodiments, the announcement may include a predetermined visual image, such as a trade mark or logo, that identifies the card issuer. Of course, sequences of images may be likewise employed.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in processing telephone calls that are charged to cards, each of said cards being identified by an associated card number and each being issued by a respective one of a plurality of card issuers, the method comprising the steps of:

receiving a card number supplied by a caller;

identifying the issuer of said card from said card number;

validating said card number; and responsive to said identifying, supplying to said caller an announcement including the name of said card issuer identified in said identifying step and the name of a carrier carrying the call.

2. The invention as defined in claim 1 wherein said announcement is supplied only if said card number is valid.

3. The invention as defined in claim 1 wherein said identifying step includes the step of determining if said card number is associated with a commercial credit card or a telephone calling card.

4. The invention as defined in claim 1 wherein said identifying step identifies said card issuer as a function of a subset of the digits of the card number.

5. The invention as defined in claim 4 wherein said subset is a prefix code.

6. The invention as defined in claim 1 wherein said identifying step identifies said card issuer as a function of the length of said card number.

7. The invention as defined in claim 1 wherein said identifying step identifies said card issuer as a function of the value of digits at predetermined digit positions within said card number.

8. The invention as defined in claim 1 wherein the announcement supplied further includes a telephone number of customer service for said card issuer if said card number is not valid.

9. The invention as defined in claim 1 further including the step of transferring said caller to customer assistance of said card issuer if said card number is not valid.

10. The invention as defined in claim 1 wherein in said receiving step said card number supplied by said caller is received by a DTMF receiver.

11. The invention as defined in claim 1 wherein in said receiving step said card number is received from said caller by a voice recognition unit.

12. The invention as defined in claim 1 further including the step of prompting said caller to supply said card number.

13. A method for use in making telephone calls that are charged to cards with the assistance of an attendant, each of said cards having an associated card number and each being issued by only one of a plurality of card issuers, the method comprising the steps of:

receiving as an input from said attendant a card number supplied to said attendant by a caller;

identifying the issuer of said card from said card number;

validating said card number; and displaying to said attendant the name of said card issuer if said card number is valid so that said attendant may make an announcement to said caller including the name of said card issuer and the name of a carrier carrying the call.

14. A method for use in making a telephone call that is carried by a carrier and charged to a valid card, said card having a card number that identifies the issuer of said card, the method being characterized by the step of supplying to a caller an announcement that includes the name of said carrier and the name of said card issuer and thanks the caller for using said carrier to carry said call and for charging said telephone call to a card issued by said card issuer.

15. A method for use in processing telephone calls that are charged to cards, each of said cards being identified by an associated card number and each being issued by a respective one of a plurality of card issuers, the method comprising the steps of:

receiving a plurality of card numbers, each of said card numbers being supplied by a respective one of a plurality of callers;

identifying from said received card numbers the issuer of each card associated with each received card number;

validating each of said received card numbers; and supplying announcements to said callers, each of said announcements being supplied to a respective one of said callers and including the name of the card issuer identified in said identifying step as having issued the card associated with the card number supplied by said respective caller;

wherein the announcement supplied to at least one of said callers includes (i) the name of a first one of said card issuers and (ii) the name of the carrier carrying the call of said at least one of said callers' and the announcement supplied to at least one other of said callers includes (iii) the name of a second one of said card issuers and (iv) the name of the carrier of said call of at least one other of said callers.

* * * * *